United States Patent Office 3,549,498
Patented Dec. 22, 1970

3,549,498
11α-SUBSTITUTED STEROIDS AND PROCESS
Patrick A. Diassi, Westfield, and Pacifico A. Principe, South River, N.J., assignors to E. R. Squibb & Sons, Inc., New York, N.Y., a corporation of Delaware
No Drawing. Filed Apr. 2, 1968, Ser. No. 718,194
Int. Cl. C12b 1/00
U.S. Cl. 195—51
1 Claim

ABSTRACT OF THE DISCLOSURE

This invention relates to a novel process and intermediates therein for the preparation of compounds having the formula:

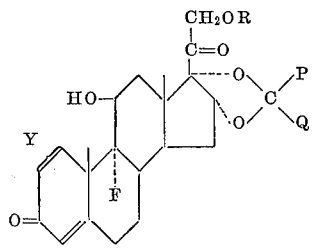

wherein Y is a single or double bond; R is selected from the group consisting of hydrogen and acyl; P is hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; and, together with the carbon to which they are joined, P and Q is a monocyclic cycloalkyl or monocyclic heterocyclic radical. The final products of this invention are therapeutically active compounds which possess glucocorticoid and anti-inflammatory activity.

---

This invention relates to a novel process and intermediates therein for the preparation of compounds having the formula:

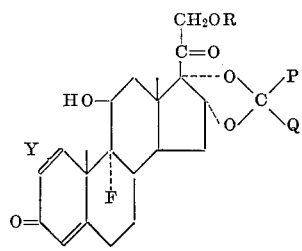

wherein Y is a single or double bond; R is selected from the group consisting of hydrogen and acyl; P is hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; and, together with the carbon to which they are joined, P and Q is a monocyclic cycloalkyl or monocyclic heterocyclic radical.

More particularly, this invention relates to the production of such materials encompassing the use of certain novel 11-hydroxy derivatives. Specifically, the final products of this invention corresponding to the above formula wherein Y represents a single bond are prepared in accordance with the following reaction schema, wherein Y, P and Q are as set forth hereinabove, and Ac represents acyl.

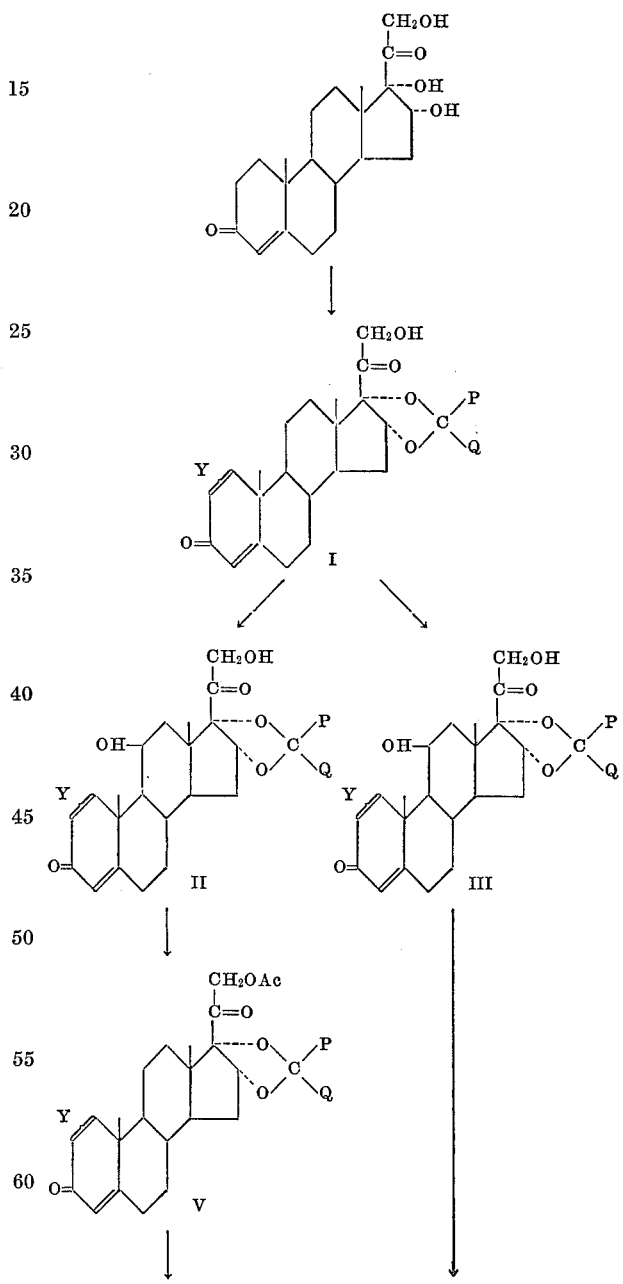

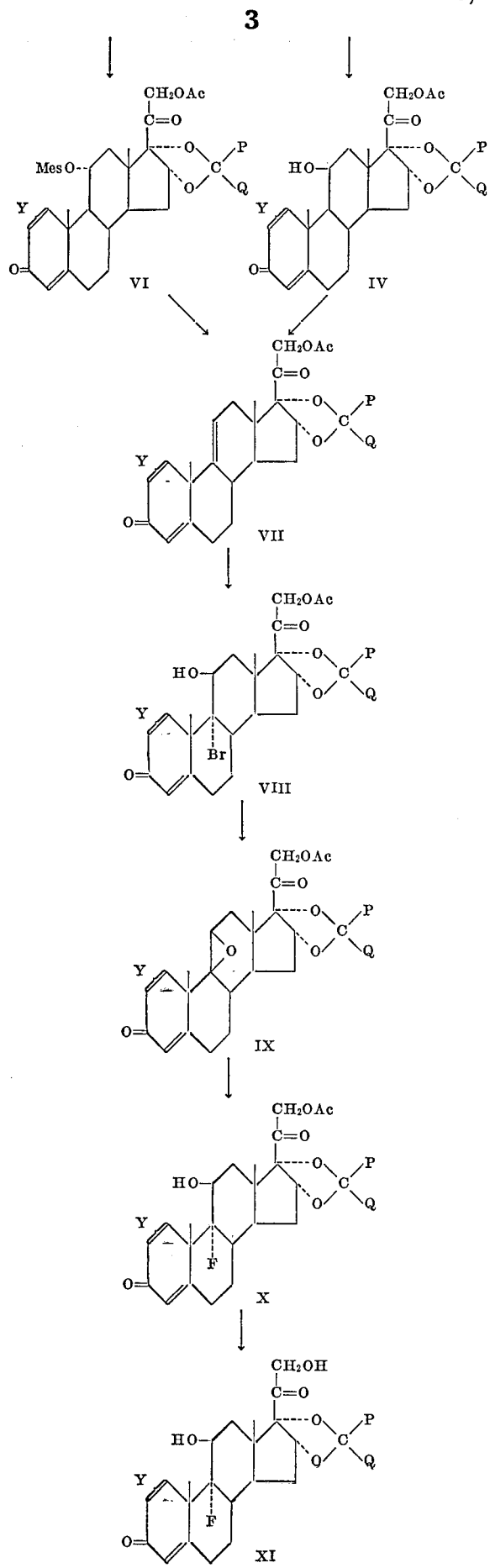

In the first step of the reaction schema, 16α-hydroxycortexolone is reacted with an aldehyde of at least two carbon atoms or a ketone. The reaction is preferably carried out by treating a suspension or solution of the steroid in the aldehyde or ketone (or an organic solvent, if the aldehyde or ketone is a solid) with an acid catalyst (e.g., perchloric acid, pertoluene sulfonic acid, and hydrochloric acid), neutralizing the acid and recovering the cyclic acetal or ketal derivative formed. This reaction, as well as representative examples of suitable aldehyde and ketal reactants, is more fully set forth in U.S. Pat. No. 3,048,581, the disclosure of which incorporated herein by reference.

The acetals or ketals (Compounds I) so formed are then subjected to the action of 11-hydroxylating microorganisms to produce the corresponding 11α- (Compounds II) or 11β- (Compounds III) hydroxy derivatives, dependent upon the microorganisms employed. To produce 11α-hydroxy derivatives, it is preferred to employ microorganisms of the genus Colletotrichum, e.g., *C. phomoides, C. pisi, C. linicola,* etc., the genus Tricothecium, e.g., *T. roseum, T. flagrans, T. domesticum,* etc., or the genus Aspergillus, e.g., *A. ochraceus,* etc.

To produce 11β-hydroxy derivatives, it is preferred to employ microorganisms of the genus Absidia, e.g., *A. coerulea,* etc., the genus Curvularia, e.g., *C. lunata,* etc., or the genus Cunninghamella, e.g., *C. blakesleeana, C. elegans,* etc.

Compounds in accordance with Formula III are then acylated, as by treatment with acetic anhydride in pyridine, to obtain the 21-acyl derivative (Compounds IV).

These acylated derivatives are then dehydrated as by treatment with pyridine and a sulfonyl chloride such as methanesulfonyl chloride in dimethylformamide to produce the 9,11-dehydro derivatives (Compounds VII).

To produce compounds in accordance with Formula VII from the 11α-hydroxy derivatives (Compounds II), these compounds are first monoacylated as set forth above to produce 21-acylated derivatives in accordance with Formula V. Mesylation of Compounds V, as by reaction with methanesulfonyl chloride, produces the 11-mesylate (Compounds VI) which is in turn eliminated by treatment with a mixture of glacial acetic acid and anhydrous sodium acetate to produce compounds in accordance with Formula VII.

The reaction of Compounds VII with N-bromoacetonide or N-bromosuccinimide in the presence of dioxane and perchloric acid, the reaction being conducted in the dark, produces the bromohydrin derivative (Compounds VIII).

Dehydrobromination of Compounds VIII, for instance, by treatment with freshly fused potassium acetate in absolute ethanol under reflux produces 9β,11β-epoxy derivative (Compounds IX) which is opened by treatment with hydrogen fluoride to produce triamcinolone derivatives (Compounds X) which in turn may be hydrolyzed by known methods to produce corresponding 21-hydroxy compounds in accordance with Formula XI. Compounds of the general Formula X can also be dehydrogenated in the 1,2-position by reaction with a quinone of sufficiently high redox potential, such as, 2,3-dichloro-5,6-dicyanobenzoquinone, to produce the corresponding 1-dehydro derivatives.

Compounds in accordance with Formula I, wherein Y represents a double bond, may be prepared from compounds in accordance with Formula I, wherein Y represents a single bond, by any of several methods, for instance, by treatment with the enzymes of 1-dehydrogenating microorganisms such as, *Corynebacterium simplex, Norcardia restrictus,* or *Mycobacterium rhodochorus.*

Alternatively, compounds in accordance with Formula I, wherein Y is a single bond, may be acylated as set forth above to produce the 21-acyl derivative, which may, in turn, be dehydrogenated by treatment with a quinone of sufficiently high redox potential, such as 2,3-dichloro-5,6-dicyano-benzoquinone to produce the corresponding 1,2-dehydro derivative. By then following the series of procedures as set forth in the above reaction schema, but employing this 1,2-dehydro derivative, compounds in accordance with Formulas II to XI, wherein Y represents a double bond, are prepared.

The final products of this invention in accordance with Formula XI are well known in the art as physiologically active substances possessing glucocorticoid and antiinflammatory activity.

The preferred acyl radicals employed are those of hydrocarbon carboxylic acids of less than twelve carbon atoms, and may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic arylcarboxylic acids (e.g., benzoic and toluic acids), the monocyclic aryl-lower alkanoic acids [e.g., phenacetic, β-phenylpropionic, α-phenylbutyric, and 5-(p-methylphenyl) pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cycloalkyl and cycloalkenyl-lower alkanoic acids [e.g., cyclohexaneacetic, α-cyclopentanebutyric, 2-cyclopenteneacetic and 3-(3-cyclohexene) pentenoic acid], and the like.

The term "lower alkyl" as employed herein, includes both straight and branched chain radicals of less than eight carbon atoms, for instance, methyl, ethyl, propyl, butyl, pentyl, hexyl, heptyl, octyl, isopropyl, t-butyl, isobutyl, isohexyl, 4,4-dimethylpentyl 2,2,4-trimethylpentyl, and the like.

The term "monocyclic aryl" as employed herein contemplates monocyclic carbocyclic aryl radicals, for instance, phenyl and substituted phenyl radicals, such as lower alkyl phenyl (e.g., o-, m- or p-tolyl, ethylphenyl, butylphenyl, and the like, di(lower alky) phenyl (e.g., 2,4-dimethylphenyl, 3,5-diethylphenyl, and the like), halophenyl (e.g., chlorophenyl, bromophenyl, iodophenyl, fluorophenyl), o-, m- or p-nitrophenyl, dinitrophenyl, (e.g., 3,5-dinitrophenyl, 2,6-dinitrophenyl, and the like), trinitrophenyl (e.g., picryl).

The terms "monocyclic cycloalkyl" and "monocyclic cycloalkenyl" include cyclic radicals containing from 3 to 6 ring members (e.g., cyclopropyl, cyclobutyl, cyclopentyl, cyclohexyl, cyclobutenyl and cyclohexenyl).

The enzymatic hydroxylation and dehydrogenation reactions are preferably effected either by including the steroid substrate in an aerobic culture of the microorganism, or by bringing together, in an aqueous medium, the steroid, air and the microorganism. In general, the conditions for culturing the microorganisms for the purposes of this invention are (except for the inclusion of the steroid to be converted) the same as those for culturing various other molds and bacteria used in fermentation processes.

The microorganism is aerobically grown in contact with (in or on) a suitable fermentation medium. A suitable medium essentially comprises a nitrogenous substance and a source of carbon and energy. The latter may be a carbohydrate (such as sucrose, molasses, glucose, maltose, starch or dextrin) a fatty acid, a fat and/or the steroid itself. Preferably, however, the medium includes an assimilable source of carbon and energy in addition to the steroid. The source of nitrogenous factors may be natural (e.g., soybean meal, corn steep liquor, meat extract and/or distillers solubles) or synthetic (i.e., composed of simple, synthesizable organic or inorganic compounds such as ammonium salts, alkali nitrates, amino acids or urea). An adequate sterile air supply should be maintained during fermentation, for example, by the conventional methods of exposing a large surface of the medium to air or by utilizing submerged aerated culture. The steroid may be added to the culture during the incubation period, or included in the medium prior to sterilization or inoculation. The preferred (but not limiting) range of concentration of the steroid in the culture is about 0.01 to 0.10% by weight. The culture period may vary considerably, e.g., within the range of about 6 to 96 hours. The steriod is then recovered from the fermentation medium in the usual manner, as more fully detailed in the examples following.

The following examples illustrate the invention (all temperatures being in degrees centigrade).

EXAMPLE 1

16α,17α,21-trihydroxypregn-4-ene-3,20-dione 16,17-acetonide

A solution of 1.0 g. of 16α,17α,21-trihydroxypregn-4-ene-3,20-dione in 50 ml. of acetone containing 0.25 ml. of 70% perchloric acid is kept at room temperature for one hour. It is then neutralized with dilute sodium bicarbonate and gradually diluted with water. The precipitate that separates is filtered, washed with water and dried to give 700 mg. of 16α,17α,21-trihydroxypregn-4-ene-3,20-dione 16,17-acetonide having a melting point about 238–240° C., $[\alpha]_D^{22}$ +135° (chloroform); λ max. 239 mμ (ε, 16,000), $\tau_{CDCl_3}^{Si(CH_3)_4}$ 9.38 (s., 19—CH$_3$), 8.83 (s., β—CH$_3$ of isopropylidine), 8.81 (s., 19—CH$_3$) 8.53 (s., α—CH$_3$ of isopropylidene), 5.32, 5.84 (ABq, 21—CH$_2$—), 4.96 (d. J=4, 16β—H), 4.26 (s., 4—H)

*Analysis.*—Calcd. for C$_{24}$H$_{34}$O$_5$ (402.51) (percent): C, 71.61; H, 8.51. Found (percent): C, 71.87; H, 8.48.

EXAMPLE 2

16α,17α,21-trihydroxypregna-1,4-diene-3,20-dione 16,17-acetonide 21-acetate

To a solution of 1.0 g. (2.25 mmol) of 16α-hydroxycortexolone 16,17-acetonide 21-acetate in 40 ml. of dry benzene are added 0.63 g. (2.8 mmol) of 2,3-dichloro-5-6-dycyanobenzoquinone and the mixture is refluxed for 42 hours. After cooling, the mixture is filtered and the precipitate washed with benzene. The filtrate and washings are then passed through a column of 25 g. of Woelm neutral alumina (Activity V) and the column washed with chloroform. The eluate is evaporated under reduced pressure and the residue crystallized from acetone-hexane to give 742 mg. of 16α,17α,21-trihydroxypregna-1,4-diene-3,20-dione 16,17-acetonide 21-acetate having a melting point about 230–233° C., $[\alpha]_D^{25}$ +82.8 (chloroform), $\lambda_{max.}^{alc.}$ 244 mμ (ε. 15,300). $\lambda_{max.}^{Nujol}$ 5.72, 5.80, 6.02, 6.19, 6.26μ, $\tau_{CDCl_3}^{SiMe_4}$ 9.28 (s., 18—CH$_3$), 8.76 (s, 19—CH$_3$), 8.76 (s., β—CH$_3$ of acetonide), 8.55 (s., α—CH$_3$ of acetonide), 7.82 (s., 21—OAc), 3.91 (s., 4—H), 3.76 (d., J=10 cps., 2—H), 2.95 (d., J=10, 1—H).

*Analysis.*—Calcd. for C$_{26}$H$_{34}$O$_6$ (442.53) (percent): C, 70.56; H, 7.74. Found (percent): C, 70.66; H, 7.82.

EXAMPLE 3

16α,17α,21-trihydroxypregna-1,4-diene-3,20-dione 16,17-acetonide (a) Via 16α,17α,21-trihydroxypregna-1,4-diene-3,20-dione 16,17-acetonide 21-acetate.—A mixture of 5.0 g. of 16α,17α,21-trihydroxypregna-1,4-diene-3,20-dione 16,17-acetonide 21-acetate in 100 ml. of oxygen-free methanol is treated with 10 ml. of 10% potassium carbonate (oxygen-free) and stirred under nitrogen at room temperature for one hour. It is then neutralized with 10% acetic acid, diluted with water whereupon crystals separated. They are filtered, washed with water and dried to give 4.2 g. of 16α,17α,21-trihydroxypregna-1,4-diene-3, 20-dione 16,17-acetonide having a melting point about 208–210° C., $[\alpha]_D^{25}$ +106° (chloroform), $\lambda_{max.}^{alc.}$ 242 m$\mu$ ($\epsilon$, 14,800), $\lambda_{max.}^{Nujol}$ 2.82, 5.86, 6.01, 6.26$\mu$, $\tau_{CDCl_3}^{SiMe_4}$ 9.35 (s., 18—$CH_3$) 8.77 (s., 19—$CH_3$), 8.85 (s., $\beta$—$CH_3$ of acetonide), 8.50 (s., $\alpha$—$CH_3$ of acetonide), 3.92 (s., 4—H), 3.79 (q., J=1.5,11 cps., 2—H), 2.99 (d., J=10 cps., 1—H)

*Analysis.*—Calcd. for $C_{24}H_{32}O_5$ (400.50) (percent): C, 71.97; H, 8.05. Found (percent): C, 71.90; H, 8.15.

(b) Via 16$\alpha$,17$\alpha$,21-trihydroxypregn-4-ene - 3,20 - dione 16,17-acetonide.—Surface growth from each of 2 two-week-old agar slants of *Corynebacterium simplex* (ATCC–6946), the slants containing as a nutrient medium (A):

|   | Grams |
|---|---|
| Glucose | 10 |
| Yeast extract | 2.5 |
| $K_2HPO_4$ | 1 |
| Agar | 20 |

Distilled water to 1 liter.

is suspended in 5 ml. of 0.01% aqueous sodium lauryl sulfate solution. One ml. portions of this suspension are used to inoculate five 250 ml. Erlenmeyer flasks, each containing 50 ml. of the following sterilized medium (B):

|   | Grams |
|---|---|
| Beef extract | 1.5 |
| Yeast extract | 3 |
| Peptone | 6 |
| Dextrose | 1 |

Distilled water to 1 liter.

After 24 hours incubation at 25° C. with continuous rotary agitation (280 cycles/minute, two-inch stroke), 5% (vol./vol.) transfers are made to twenty 250 ml. Erlenmeyer flasks each containing 50 ml. of freshly sterilized medium B.

After approximately 24 hours of continual incubation, using the same conditions as described above, steroid (500 micrograms/ml.) is added by supplementing each flask with 0.25 ml. of a sterile solution (100 mg./ml.) of 16$\alpha$,17$\alpha$,21-trihydroxypregn - 4 - ene - 3,20 - dione 16,17-acetonide in N,N-dimethylformamide. A total of 500 mg. is fermented.

After approximately 72 hours of further incubation using identical conditions as described above, the contents of the flasks are pooled. The final broth volume is approximately 1000 ml. The broth is extracted three times with 300 ml. portions of chloroform which are combined, washed with water and evaporated under reduced pressure. Crystallization of the residue from acetone-hexane gives 16$\alpha$,17$\alpha$,21-trihydroxypregna-1,4-diene-3,20-dione 16,17-acetonide.

(c) Via 16$\alpha$,17$\alpha$,21-trihydroxypregn - 4-ene-3,20-dione 16,17-acetonide.—Acetone-dried cells of *Corynebacterium simplex* (ATCC–6946) were prepared according to the procedure described in Pat. No. 3,360,439.

To each of two 250 ml. Erlenmeyer flasks containing 50 ml. of 0.05 M phosphate buffer (pH 7.0) is added 1 g. of *Corynebacterium simplex* (ATCC–6946) acetone-dried cells. The mixture is then thoroughly shaken to distribute the cells. Hydrogen acceptor, 2-methyl-1, 4-naphthoquinone (3.44 mg.) is then added in ethanol (0.25 ml.) to give a final concentration of 0.4 mM. The flasks are then supplemented with steroid (mg./ml.) by adding to each flask 0.5 ml. of a solution (100 mg./ml.) of 16$\alpha$-hydroxycortexolone 16,17-acetonide in N,N-dimethylformamide. A total of 100 mg. of steroid is used.

After approximately 21 hours incubation at 30° C. with continuous rotary agitation (280 cycles/minute; two-inch stroke), the contents of the flasks are pooled and the mixture is adjusted to pH 4.0 with 12 $NH_2SO_4$. The acidified reaction mixture is then filtered through a Seitz clarifying pad. The flasks and pad are washed with 50 ml. of warm water. The combined filtrate and washings have a volume of 150 ml. The filter pad is then extracted with acetone by using successive 20 ml. portions of acetone. A total of 100 ml. of acetone-extract is collected. The acetone is partially removed under reduced pressure and the combined extract and filtrates are extracted with chloroform. The chloroform is washed well with water, evaporated and the residue crystallized from acetone hexane to give 16$\alpha$,17$\alpha$,21-trihydroxypregna-1,4-diene-3,20-dione 16,17-acetonide.

EXAMPLE 4

16$\alpha$-hydroxyepihydrocortisone 16,17-acetonide (A) *Fermentation.*—Surface growth from each of 2 two-week-old agar slants of *Aspergillus ochraceus* (NRRL–405), the slants containing as a nutrient medium (A):

|   | Grams |
|---|---|
| Glucose | 10 |
| Yeast extract | 2.5 |
| $K_2HPO_4$ | 1 |
| Agar | 20 |

Distilled water to 1 liter.

is suspended in 5 ml. of a 0.01% aqueous sodium lauryl sulfate solution. One ml. portions of this suspension are used to inoculate eight 250 ml. Erlenmeyer flasks, each containing 50 ml. of the following sterilized medium (B):

|   | Grams |
|---|---|
| Cornsteep liquor | 40 |
| Glucose | 20 |

Distilled water to 1 liter.

Adjust to pH 6.5 with NaOH before sterilization.

After 24 hours incubation at 25° C. with continuous rotary agitation (280 cycles/minute; two-inch stroke), 10% (vol./vol.) transfers are made to fifty 250 ml. Erlenmeyer flasks each containing 50 ml. of the following sterilized medium (C):

|   | Grams |
|---|---|
| Cornsteep liquor | 10 |
| Glucose | 5 |

Distilled water to 1 liter.

Adjust pH 6.5 with NaOH before sterilization.

Steroid (200 micrograms/ml.) is then added by supplementing each flask with 0.25 ml. of a sterile solution (40 mg./ml.) of 16$\alpha$,17$\alpha$,21-trihydroxypregn-4-ene-3,20-dione 16,17-acetonide in N,N-dimethylformamide, a total of 500 mg. is fermented.

After approximately six days of further incubation, using the identical conditions as described above, the contents of the flasks are pooled and the broth is then filtered through a Seitz clarifying pad. The flasks, mycelium and pad are washed with successive 100 ml. portions of warm water. The combined filtrate and washings have a volume of 2600 ml. The filtrate is extracted three times with 500 ml. portions of chloroform which are combined, washed with water and evaporated under reduced pressure. The residue which is obtained is plate chromatographed on silica gel $HF_{254}$ using ethyl acetate-chloroform (1:1, v.:v.) as the developing solvent. The band at $R_f \approx 0.6$ detectable by U.V. is eluted with 40% methanol in ethyl acetate and after evaporation of the solvent is crystallized from acetone-hexane to give 200 mg. of 16$\alpha$-hydroxyepihydrocortisone 16,17-acetonide having a melting point about 236–238° C., $[\alpha]_D^{22}$ +103°, $\tau_{CDCl_3}^{Si(CH_3)_4}$ 9.34 (s., 18—$CH_3$), 8.82 (s., $\beta$—$CH_3$ of isopropylidene), 8.68 (s., 19—$CH_3$), 8.51 (s., $\alpha$—$CH_3$ of isopropylidene), $\lambda_{max.}^{alc.}$ 240 m$\mu$ ($\epsilon$, 15,200).

*Analysis.*—Calcd. for $C_{24}H_{34}O_6$ (418.51) (percent): C, 68.87; H, 8.19. Found (percent): C, 68.57; H, 8.17.

EXAMPLE 5

16α-hydroxyepiprednisolone 16,17-acetonide

Following the procedure of Example 4 but substituting 16α,17α,21 - trihydroxypregna - 1,4 - diene - 3,20 - dione 16,17 - acetonide for the 16α,17α,21 - trihydroxypregn - 4-ene - 3,20 - dione 16,17 - acetonide there is obtained 16α-hydroxyepiprednisolone 16,17-acetonide having a melting point about 255–257° C., $[\alpha]_D^{25}+63°$ (chloroform), $\lambda_{max}^{alc.}$ 247 m$\mu$ ($\epsilon$, 16,400), $\tau_{CDCl_3}^{SiMe_4}$ 9.32 (s., 18—CH$_3$), 8.69 (s., 19—CH$_3$), 8.85 (s., $\beta$—CH$_3$ of acetonide), 8.55 (s., $\alpha$—CH$_3$ of acetonide), 6.04 (m., 11$\beta$—H), 4.95 (d., J=4 cps., 16$\beta$—H), 3.91 (s., 4—H), 3.72 (q., J=210 cps., 2—H), 2.24 (d., J=10, 1—H)

*Analysis.*—Calcd. for C$_{24}$H$_{32}$O$_6$ (416.50) (percent): C, 69.21; H, 7.74. Found (percent): C, 68.79; H, 8.04.

EXAMPLE 6

16α-hydroxyhydrocortisone 16,17-acetonide (A) Fermentation.—Surface growth from each of 2 two-week-old agar slants of *Absidia coerulea* (CBS) (Centraalbureau voor Schimmel Cultures, Baarn, Netherlands), the slants containing as a nutrient medium (A):

| | Grams |
|---|---|
| Glucose | 10 |
| Yeast extract | 2.5 |
| K$_2$HPO$_4$ | 1 |
| Agar | 20 |
| Distilled water to 1 liter. | | is suspended in 5 ml. of 0.01% aqueous sodium lauryl sulfate solution. One ml. portions of this suspension are used to inoculate eight 250 ml. Erlenmeyer flasks each containing 50 ml. of the following sterilized medium (B):

| | Grams |
|---|---|
| Cornsteep liquor | 6 |
| NH$_4$H$_2$PO$_4$ | 3 |
| Yeast extract | 2.5 |
| Dextrose | 10 |
| CaCO$_3$ | 2.5 |
| Distilled water to 1 liter. | |

After 24 hours incubation at 25° C. with continuous rotary agitation (280 cycles/minute; two-inch stroke), 10% (vol./vol.) transfers are made to twenty 250 ml. Erlenmeyer flasks each containing 50 ml. of freshly sterilized medium (B). Steroid (300 micrograms/ml.) is then added by supplementing each flask with 0.25 ml. of a sterile solution (60 mg./ml.) of 16α-hydroxycortexolone 16,17 - acetonide in N,N - dimethylformamide. A total of 300 mg. is fermented.

After approximately 26 hours of further incubation, using identical conditions as described above, the contents of the flasks are pooled and the broth is then filtered through a Seitz clarifying pad. The flasks, mycelium and pad are washed with successive 100 ml. portions of warm water. The combined filtrate and washings have a volume of 1200 ml. They are extracted three times with 400 ml. portions of chloroform which are combined, washed with water and evaporated under reduced pressure. Crystallization of the residue from acetone-hexane gives 16α - hydroxyhydrocortisone 16,17 - acetonide having a melting point of about 205–206° C.

EXAMPLE 7

16α-hydroxyprednisolone 16,17-acetonide (a) Via 16α,17α,21 - trihydroxypregna - 1,4 - diene- 3,20 - dione 16,17 - acetonide.—(A) Fermentation—Surface growth from each of 2 two-week-old agar slants of *Curvularia lunata* (NRRL–2380), the slants containing as nutrient medium (A):

| | Grams |
|---|---|
| Glucose | 10 |
| Yeast extract | 2.5 |
| K$_2$HPO$_4$ | 1 |
| Agar | 20 |
| Distilled water to 1 liter. | | is suspended in 5 ml. of 0.01% aqueous sodium lauryl sulfate solution. One ml. portions of this suspension are used to inoculate eight 250 ml. Erlenmeyer flasks, each containing 50 ml. of the following sterilized medium (B):

| | Grams |
|---|---|
| Glucose | 30 |
| Soy bean meal | 20 |
| Soy bean oil | 2.2 |
| CaCO$_3$ | 2.5 |
| Distilled water to 1 liter. | |

After approximately 48 hours incubation at 25° C. with continuous rotary agitation (280 cycles/minute; two-inch stroke), 10% (vol./vol.) transfers are made to twenty 250 ml. Erlenmeyer flasks each containing 50 ml. of the following sterilized medium (C):

| | Grams |
|---|---|
| Cornsteep liquor | 6 |
| NH$_4$H$_2$PO$_4$ | 3 |
| Yeast extract | 2.5 |
| Dextrose | 10 |
| CaCO$_3$ | 2.5 |
| Distilled water to 1 liter. | |

Steroid (500 micrograms/ml.) is then added by supplementing each flask with 0.25 ml. of a sterile solution (100 mg./ml.) of 16α,17α,21 - trihydroxypregna - 1,4 - diene-3,20 - dione 16,17 - acetonide in N,N - dimethylformamide. A total of 500 mg. is fermented.

After approximately five days of further incubation using identical conditions as described above, the contents of the flasks are pooled and the broth is then filtered through a Seitz clarifying pad. The flasks, mycelium and pad are washed with successive 100 ml. portions of warm water. The combined filtrate and washings have a volume of 1200 ml. They are extracted three times with 400 ml. portions of chloroform which are combined, washed with water and evaporated under reduced pressure. Crystallization of the residue from acetone-hexane gives 16α - hydroxyprednisolone 16,17 - acetonide having a melting point of about 263–265° C.

(b) Via 16α - hydroxyhydrocortisone 16,17 - acetonide.—Fermentation—Surface growth from a two-week-old agar slant of *Corynebacterium simplex* (ATCC–6946), the slants containing as a nutrient medium (A):

| | Grams |
|---|---|
| Glucose | 10 |
| Yeast extract | 2.5 |
| K$_2$HPO$_4$ | 1 |
| Agar | 20 |
| Distilled water to 1 liter. | | is suspended in 5 ml. of a 0.01% aqueous sodium lauryl sulfate solution. One ml. portions of this suspension are used to inoculate three 250 ml. Erlenmeyer flasks, each containing 50 ml. of the following sterilized medium (B):

| | Grams |
|---|---|
| Beef extract | 1.5 |
| Yeast extract | 3 |
| Peptone | 6 |
| Dextrose | 1 |
| Distilled water to 1 liter. | |

After 24 hours incubation at 25° C. with continuous rotary agitation (280 cycles/minute; two-inch stroke), 5% (vol./vol.) transfers are made to ten 250 ml. Erlenmeyer flasks each containing 50 ml. of freshly sterilized medium B.

After approximately 24 hours of continued incubation, using the same conditions as described above, steroid (500 micrograms/ml.) is added by supplementing each flask with 0.25 ml. of a sterile solution (100 mg./ml.) of 16α-hydroxyhydrocortisone 16,17-acetonide in N,N-dimethylformamide. A total of 250 mg. is fermented.

After approximately five days of further incubation using identical conditions as described above, the contents of the flasks are pooled. The final broth volume is approximately 500 ml. The broth is extracted with three 150 ml. portions of chloroform which are combined, washed with water and evaporated under reduced pressure. Crystallization of the residue gives 200 mg. of 16α-hydroxyprednisolone 16,17-acetonide.

(c) Via 16α-hydroxyhydrocortisone 16,17-acetonide.—Acetone-dried cells of *Corynebacterium simplex* (ATCC–6946) were prepared according to the procedures described in Pat. No. 3,360,439.

To each of five 250 ml. Erlenmeyer flasks containing 50 ml. of 0.05 M phosphate buffer (pH 7.0) is added 1 g. of *Corynebacterium simplex* (ATCC–6946) acetone-dried cells. The mixture is thoroughly shaken to distribute the cells. Hydrogen acceptor, 2-methyl-1,4-naphthoquinone (3.44 mg.) is then added in ethanol (0.25 ml.) to give a final concentration of 0.4 mM. The flasks are then supplemented with steroid (mg./ml.) by adding to each flask 0.5 ml. of a solution (100 mg./ml.) of 16α-hydroxyhydrocortisone 16,17-acetonide in N,N-dimethylformamide. A total of 250 mg. of steroid is used.

After approximately 17 hours incubation at 30° C. with continuous rotary agitation (280 cycles/minute; two-inch stroke) the contents of the flasks are pooled and the stroke) the contents of the flasks are pooled and the reaction mixture is adjusted to pH 3.5 using 12 $NH_2SO_4$. The acidified mixture is then filtered through a Seitz clarifying pad. The flasks and pad are washed with successive 50 ml. portions of warm water. The combined filtrate and washings have a volume of 500 ml. The filter pad is then extracted with acetone by using successive 100 ml. portions of acetone. A total of 500 ml. of acetone-extract is collected. The acetone is removed partially under reduced pressure and the combined filtrates are extracted with chloroform. The chloroform is washed with water, evaporated and the residue crystallized from acetone-hexane to give 16α-hydroxyprednisolone 16,17-acetonide.

EXAMPLE 8

16α-hydroxyhydrocortisone 16,17-acetonide 21-acetate

A solution of 214 mg. of 16α-hydroxyhydrocortisone 16,17-acetonide in 3 ml. of dry pyridine and 1 ml. of acetic anhydride is kept at room temperature for 16 hours then diluted with ice-water and extracted with chloroform. The chloroform is washed successively with 2 N hydrochloric acid, 5% sodium bicarbonate and water and evaporated under reduced pressure. Crystallization of the residue from acetone-hexane gives 200 mg. of 16α-hydroxyhydrocortisone 16,17-acetonide 21-acetate having a melting point about 244–246° C., $[\alpha]_D^{25}+145°$ (chloroform), $\lambda_{max.}^{alc.}$ 240 m$\mu$ ($\epsilon$, 16,000), $\lambda_{max.}^{Nujol}$ 2.98, 2.74, 2.80, 6.04, 6.19$\mu$, $\tau_{CDCl_3}^{SiMe_4}$ 9.08 (s., 18—$CH_3$), 8.55 (s., 19—$CH_3$), 8.77 (s., β—$CH_3$ of acetonide), 8.55 (s., α—$CH_3$ of acetonide), 7.82 (s., 21—OAc), 5.49 (m., 11α—H), 4.32 (s., 4—H)

*Analysis.*—Calcd. for $C_{26}H_{36}O_7$ (450.55) (percent): C, 67.80; H, 7.88. Found (percent): C, 67.79; H, 8.06.

EXAMPLE 9

16α-hydroxyprednisolone 16,17-acetonide 21-acetate (a) From 16α-hydroxyprednisolone 16,17-acetonide.—Following the procedure of Example 8 but substituting 16α-hydroxyprednisolone 16,17-acetonide for the 16α-hydroxyhydrocortisone 16,17-acetonide there is obtained 16α-hydroxyprednisolone 16,17-acetonide 21-acetate having a melting point about 246–248° C., $[\alpha]_D^{25}+107°$ (chloroform), $\lambda_{max.}^{alc.}$ 243 m$\mu$ ($\epsilon$, 14,000), $\lambda_{max.}^{Nujol}$ 2.98, 5.72, 5.80, 6.02, 6.20, 626$\mu$, $\tau_{CDCl_3}^{SiMe_4}$ 9.07 (s., 18—$CH_3$), 8.78 (s., β—$CH_3$ of acetonide), 8.57, 8.55 (s., s., 19—$CH_3$ and α—$CH_3$ of acetonide), 7.82 (s., 21—OAc), 5.49 (m, 11α—H), ≈ 5.0 (m., 16β—H), 3.97 (s., 4—H), 3.74 ($\mu$, J=2, 10 cps., 2—H), 2.73 (d., J=10, 1—H)

*Analysis.*—Calcd. for $C_{25}H_{34}O_7$ (458.53) (percent): C, 68.10; H, 7.47. Found (percent): C, 68.19; H, 7.41.

(b) From 16α-hydroxyhydrocortisone 16,17-acetonide 21-acetate.—Folowing the procedure of Example 2 but substituting 16α-hydroxyhydrocortisone 16,17 - acetonide 21-acetate for the 16α-hydroxycortexolone 16,17-acetonide 21-acetate there is obtained 16α-hydroxyprednisolone 16,17-acetonide 21-acetate.

EXAMPLE 10

16α-hydroxyepihydrocortisone 16,17-acetonide 21-acetate

To 100 mg. (0.239 mmol) of 16α-hydroxyepihydrocortisone 16,17-acetonide are added 3.4 ml. of a solution containing 188.3 mg. of active anhydride in 25 ml. of pyridine and the resulting solution kept overnight at room temperature. The reaction mixture is then evaporated under reduced pressure and the residue plate chromatographed on silica gel $HF_{254}$ using ethyl acetate-chloroform (1:1, v.:v.) as the developing solvent. The band at $R_f \approx 0.7$ detectable by U.V. is eluted with methanolethyl acetate (2:3, v.:v.) and after evaporation of the solvent the residue is crystallized from acetone to give 73 mg. of 16α-hydroxyepihydrocortisone 16,17-acetonide 21-acetate which has a melting point about 270–272° C., $[\alpha]_D^{22}+107°$ (chloloform), $\lambda_{max.}^{alc.}$ 240 m$\mu$ ($\epsilon$, 16,000), $\tau_{CDCl_3}^{Si(CH_3)_4}$ 9.29 (s., 18—$CH_3$), 8.76 (s, β—$CH_3$ of isopropylidene), 8.69 (s., 19—$CH_3$), 8.52 (s, α—$CH_3$ of isopropylidene), 7.82 (s., 21—OAc), 5.93 (m., 11β—H), 5.07 (center ABq, 21—$CH_2$—) 5.01 (m., 16β—H), 4.27 (s., 4—H)

*Analysis.*—Calcd. for $C_{26}H_{36}O_7$ (460.55) (percent): C, 67.80; H, 7.88. Found (percent): C, 67.65; H, 8.04.

Similarly 16α-hydroxyepiprednisolone 16,17-acetonide is converted to 16α-hydroxyepiprednisolone 16,17-acetonide 21-acetate.

EXAMPLE 11

16α-hydroxyepihydrocortisone 16,17-acetonide 11-mesylate 21-acetate

To a solution of 206 mg. of 16α-hydroxyepihydrocortisone 16,17-acetonide 21-acetate in 5 ml. of dry pyridine and cooled to 5° C. is added 0.5 ml. of methanesulfonyl chloride and the mixture kept at this temperature for 16 hours. Ice is then added to the mixture and after thirty minutes it is diluted with water and extracted with chloroform. The chloroform is washed successively with 2 N HCl, 5% sodium bicarbonate and water and evaporated under reduced pressure. Crystallization of the residue gives 16α-hydroxyepihydrocortisone 16,17-acetonide 11-mesylate 21-acetate.

Similarly 16α-hydroxyepiprednisolone 16,17-acetonide 21-acetate gives 16α-hydroxyepiprednisolone 16,17-acetonide 11-mesylate 21-acetate.

EXAMPLE 12

16α,17α,21-trihydroxypregn-4,9(11)-dien-3,20-dione 16,17-acetonide 21-acetate (a) Via 16α-hydroxyepihydrocortisone 16,17-acetonide 11-mesylate 21-acetate.—To a solution of 262 mg. of 16α-hydroxyepihydrocortisone 16,17-acetonide 11-mesylate 21-acetate in 10 ml. of glacial acetic acid 1.0 g. of anhydrous sodium acetate is added and the mixture refluxed for 1.5 hours. The mixture is cooled, diluted with water and the crystals which separate are filtered, washed with water and dried to give 167 mg. of 16α,17α,21-trihydroxypregn-4,9(11)-diene-3,20-dione 16,17 - acetonide 21-acetate having a melting point about 226–228° C., $[\alpha]_D^{22}+97°$ (chloroform), $\lambda_{max.}^{alc.}$ 238 mμ (ε, 16,900), $\tau_{CDCl_3}^{Si(CH_3)_4}$ 9.38 (18—CH$_3$), 8.75 (s., β—CH$_3$ of isopropylidene), 8.67 (s., 19—CH$_3$), 8.54 (s., α—CH$_3$ of isopropylidene), 5.20 —4.95 (ABq, 21—CH$_2$—), 4.96 (m., 16β—H), 4.43 (m., 11—H), 4.26 (s., 4—H).

*Analysis.*—Calcd. for C$_{26}$H$_{34}$O$_6$ (442.53) (percent): C, 70.56; H, 7.74. Found (percent): C, 70.70; H, 7.93.

(b) Via 16α-hydroxyhydrocortisone 16,17 - acetonide 21-acetate.—To a solution of 500 mg. of 16α-hydroxyhydrocortisone-6,17-acetonide 21-acetate in 13.2 ml. of dimethylformamide and 1.95 ml. of dry pyridine maintained at 80° C. is added 0.88 ml. of methanesulfonyl chloride and the resulting mixture kept at 80° C. for 1.5 hours. It is then cooled and slowly diluted with ice-water whereupon crystals of 16α,17α,21 - trihydroxypregna-4,9 (11)-diene-3,20-dione 16,17-acetonide 21-acetate separate. These are filtered, washed with water and dried to give 444 mg. of product.

EXAMPLE 13

16α,17α,21-trihydroxypregna-1,4,9(11)-triene-3,20-dione 16,17-acetonide 21-acetate (a) Via 16α,17α,21-trihydroxypregna - 4,9(11)-diene-3,20-dione 16,17 - acetonide 21 - acetate.—Following the procedure of Example 2 but substituting 16α,17α,21-trihydroxypregna-4,9(11)-diene-3,20 - dione 16,17-acetonide 21-acetate for the 16α-hydroxycortexolone 16,17-acetonide 21-acetate there is obtained 16α,17α,21-trihydroxypregna-1,4,9(11)-triene-3,20-dione 16,17 - acetonide 21-acetate having a melting point about 208–210° C., $[\alpha]_D^{25}+34°$ (chloroform), $\lambda_{max.}^{alc.}$ 238 mμ (ε, 13,500), $\lambda_{max.}^{Nujol}$ 5.70, 5.80, 6.01, 6.17, 6.24μ, $\tau_{CDCl_3}^{SiMe_4}$ 9.34 (s., 18—CH$_3$), 8.60 (s., 19—CH$_3$), 8.76 (s., β—CH$_3$ of acetonide), 8.57 (s., α—CH$_3$ of acetonide), 7.82 (s., 21—OAc).

*Analysis.*—Calcd. for C$_{26}$H$_{52}$O$_6$ (440.53) (percent): C, 70.89; H, 7.32. Found (percent): C, 71.04; H, 7.49.

(b) Via 16α-hydroxyprednisolone 16,17-acetonide 21-acetate.—Following the procedure of Example 12b but substituting 16α-hydroxyprednisolone 16,17-acetonide 21-acetate for the 16α-hydroxyhydrocortisone 16,17-acetonide 21-acetate there is obtained 16α,17α,21-trihydroxypregna-1,4,9(11)-triene-3,20 - dione 16,17-acetonide 21-acetate.

(c) Via 16α-hydroxyepiprednisolone 16,17 - acetonide 11-mesylate 21-acetate.—Following the procedure of Example 12a but substituting 16α-hydroxyepiprednisolone 16,17-acetonide 11-mesylate 21-acetate for the 16α-hydroxyepihydrocortisone 16,17-acetonide 11-mesylate 21-acetate there is obtained 16α,17α,21-trihydroxypregna-1,4,9(11)-triene-3,20-dione 16,17-acetonide 21-acetate.

EXAMPLE 14

9α-bromo-16α-hydroxyhydrocortisone 16,17-acetonide 21-acetate

To a solution of 700 mg. of 16α,17α,21-trihydroxypregna-4,9(11)-diene - 3,20 - dione 16,17-acetonide 21-acetate in 16 ml. of purified dioxane and 2.06 ml. of 0.5 N perchloric acid 442 mg. of N-bromoacetamide are added and the reaction protected from light is kept at room temperature for 30 minutes. The excess N-bromoacetamide is decomposed with dilute sodium sulfite and the mixture diluted with water. The crystals which separate are filtered, washed with water and dried to give 700 mg. of 9α-bromo-16α-hydroxyhydrocortisone 16,17-acetonide 21-acetate having a melting point about 163–165° C., $[\alpha]_D+109°$ (chloroform), $\lambda_{max.}^{alc.}$ 242 mμ (ε, 15,500), $\tau_{CDCl_3}^{Si(CH_3)_4}$ 9.09 (s., 18—CH$_3$), 8.74 (., β—CH$_3$ of isopropylidene), 8.44 (s., α—CH$_3$ of isopropylidene), 8.55 (s., 19—CH$_3$), 5.09 (m., 21 —CH$_2$—), 5.31 (m., 11α—H), 4.26 (s., 4—H).

*Analysis.*—Calcd. for C$_{26}$H$_{35}$O$_7$BR (539.45) (percent): C, 57.89; H, 6.54. Found (percent): C, 57.97; H, 7.05.

EXAMPLE 15

9α-bromo-16α-hydroxyprednisolone 16,17-acetonide 21-acetate

Following the procedure of Example 14 but substituting 16α,17α,21-trihydroxypregna-1,4,9(11) - triene-3,20-dione 16,17-acetonide 21-acetate for the 16α,17α,21-trihydroxypregna-4,9(11)-diene - 3,20-dione 16,17-acetonide 21-acetate there is obtained 9α-bromo-16α-hydroxyprednisolone 16,17-acetonide 21-acetate having a melting point about 202–203° C., $[\alpha]_D^{25}+111°$ (chloroform), $\lambda_{max.}^{alc.}$ 241 mμ (ε, 13,000), $\lambda_{max.}^{Nujol}$ 2.92, 3.06, 5.72, 5.80, 6.02, 6.16(sh.), 6.20μ

*Analysis.*—Calcd. for C$_{26}$H$_{33}$O$_7$Br (537.43) (percent): C, 58.11; H, 6.19; Br, 14.87. Found (percent): C, 58.52; H, 5.93; Br, 15.41.

EXAMPLE 16

9β,11β-epoxy-16α,17α,21-trihydroxypregn-4-ene-3,20-dione 16,17-acetonide 21-acetate A solution of 600 mg. of 9α-bromo - 16α - hydroxyhydrocortisone-16,17-acetonide 21-acetate and 980 mg. of freshly fused potassium acetate in 25 ml. of absolute ethanol is refluxed under nitrogen for one hour and then diluted with water. The crystals which separate are filtered, washed with water and dried to give 410 mg. of 9β,11β-epoxy-16α,17α,21-trihydroxypregn - 4 - ene - 3,20-dione 16,17-acetonide 21-acetate having a melting point about 238–240° C., $[\alpha]_D^{27} +23°$ (chloroform), $\lambda_{max.}^{alc.}$ 241 mμ (ε, 15,000), $\tau_{CDCl_3}^{Si(CH_3)_4}$ 9.16 (s., 18—CH$_3$), 8.76 (s., β—CH$_3$ of isopropylidene), 8.58 (s., 19—CH$_3$), 8.53 (s., α—CH$_3$ of isopropylidene), 6.53 (m., 11α—H), 5.30, 4.92 (ABq—CH$_2$—), 5.02 (d., J=4, 16β—H), 4.22 (s., 4—H)

*Analysis.*—Calcd. for C$_{26}$H$_{34}$O$_7$ (458.53) (percent): C, 68.10; H, 7.47. Found (percent): C, 68.27; H, 7.59.

EXAMPLE 17

9β,11β-epoxy-16α,17α,21-trihydroxypregna-1,4-dien 3,20-dione 16,17-acetonide 21-acetate Following the procedure of Example 16 but substituting 9α-bromo-16α-hydroxyprednisolone 16,17 - acetonide-21-acetate for the 9α-bromo-16α-hydroxyhydrocortisone 16,17-acetonide there is obtained 9β,11β-epoxy-16α,17α,21-trihydroxypregna-1,4-diene-3,20-dione 16,17-acetonide 21-acetate having a melting point of about 210–215° C., $\lambda_{max.}^{Nujol}$ 5.71, 5.80, 6.01, 6.16, 6.24 μ

EXAMPLE 18

9α-fluoro-16α-hydroxyhydrocortisone 16,17-acetonide 21-acetate and 9α-fluoro-16α-hydroxyprednisolone 16,17-acetonide 21-acetate To a solution of 250 mg. of 9β,11β-epoxy-16α,17α,21-trihydroxypregn-4-ene-3,20 - dione 16,17 - acetonide 21-acetate in 10 ml. of chloroform and 2.2 ml. of tetrahydrofuran contained in a polyethylene bottle and cooled in an acetone-Dry Ice bath 2.0 ml. of hydrogen fluoride are pipetted by means of a polyethylene pipette. The acetone-Dry Ice bath is replaced by an ice-water bath and the mixture stirred for four hours. It is then transferred to a polyethylene beaker diluted with 50 ml. each of chloroform and water and slowly neutralized by the addition of sodium bicarbonate. The chloroform is separated, washed well with water and evaporated under reduced pressure. The residue is crystallized from acetone-hexane to give 115 mg. of 9α-fluoro-16α-hydroxyhydrocortisone 16,17-acetonide 21-acetate having a melting point about 220–222° C.

Similarly, starting from 9β,11β-epoxy-16α,17α,21-trihydroxypregna-1,4-diene-3,20-dione 16,17-acetonide 21-acetate there is obtained 9α-fluoro-16α-hydroxyprednisolone 16,17-acetonide 21-acetate.

EXAMPLE 19

9α-fluoro-16α-hydroxyhydrocortisone 16,17-acetonide and 9α-fluoro-16α-hydroxyprednisolone 16,17-acetonide Following the procedure of Example 3a but substituting the 9α-fluoro-16α-hydroxyhydrocortisone 16,17-acetonide 21-acetate and 9α-fluoro-16α-hydroxyprednisolone 16,17-acetonide 21-acetate for the 16α,17α,21-trihydroxypregna-1,4-diene-3,20-dione 16,17-acetonide 21-acetate there are obtained 9α-fluoro-16α-hydroxyhydrocortisone 16,17-acetonide and 9α-fluoro-16α-hydroxyprednisolone 16,17-acetonide.

The invention may be variously otherwise embodied within the scope of the appended claim.

What is claimed is:

1. A process for the preparation of compounds having the formula:

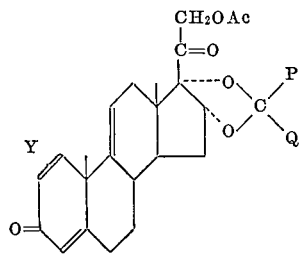

wherein Y is a single or double bond; P is selected from the group consisting of hydrogen, lower alkyl, halo lower alkyl, monocyclic cycloalkyl, monocyclic cycloalkyl lower alkyl, monocyclic aryl, monocycic aryl lower alkyl; Q is selected from the group consisting of lower alkyl, halo alkyl lower alkyl, monocyclic aryl monocyclic aryl lower alkyl; and, together with the carbon to which they are joined, P and Q is monocyclic cycloalkyl, each of the above cycloalkyl radicals containing from 3 to about 6 ring members and Ac is acyl containing less than about twelve carbon atoms; which comprises subjecting a compound of the formula:

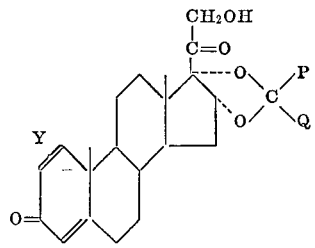

to the action of enzymes of an 11α-hydroxylating microorganism selected from the group consisting of microorganisms of the genus Colletotrichum, or the genus Tricothecium, acylating the resulting 11α-hydroxy compound, reacting the resulting 21 - acyl derivative with methanesulfonyl chloride to produce the 11-mesylate, subjecting the 11-mesylate to an elimination reaction and recovering the 9,11-dehydro product so obtained.

References Cited

UNITED STATES PATENTS

| | | | |
|---|---|---|---|
| 2,990,401 | 6/1961 | Bernstein et al. | 260—239.55 |
| 3,013,945 | 12/1961 | Ilausky et al. | 195—51 |
| 3,079,384 | 2/1963 | Diassi et al. | 260—239.55 |
| 3,084,159 | 4/1963 | Kirk et al. | 260—239.55 |
| 3,124,571 | 3/1964 | Ringold et al. | 260—239.55 |

OTHER REFERENCES

Fried et al. JACS, vol. 79, pp. 1130–1135 (1957).

HENRY A. FRENCH, Primary Examiner

U.S. Cl. X.R.
260—239.55, 999

PO-1050
(5/69)

UNITED STATES PATENT OFFICE
CERTIFICATE OF CORRECTION

Patent No. __3,549,498__     Dated __December 22, 1970__

Inventor(s) __P. A. Diassi and P. A. Principe__

It is certified that error appears in the above-identified patent and that said Letters Patent are hereby corrected as shown below:

Column 2, formula V,

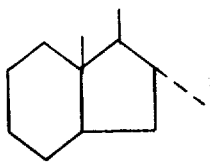     should read     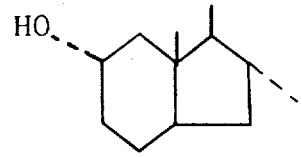

Column 7, line 3, "6.01, 6.26µ," should read--6.01, 6.19, 6.2(
Column 12, line 25 "active" should read--acetic--, and on lin
"-dien-" should read-- -diene- --. Column 14, line 41,
"( ε , 15,000)" should read--( ε , 15,100)--, and on line 51, "
should read--diene--. Column 15, line 42, "monocycic aryl lo
should read--monocyclic aryl lower--. Column 16, line 1, "al
lower alkyl, monocyclic aryl monocyclic aryl lower alkyl;" sho
read--lower alkyl, monocyclic cycloalkyl, monocyclic cycloalk
lower alkyl, monocyclic aryl, monocyclic aryl lower alkyl;--.

Signed and sealed this 6th day of July 1971.

(SEAL)
Attest:

EDWARD M. FLETCHER, JR.
Attesting Officer

WILLIAM E. SCHUYLER, JR
Commissioner of Patents